3,447,932
METHOD OF PROVIDING A DIETETIC MEAT PRODUCT

Floyd C. Olson and Jack C. Trautman, Madison, Wis., assignors to Oscar Mayer & Co., Inc., Chicago, Ill., a corporation of Illinois
No Drawing. Filed Nov. 26, 1965, Ser. No. 510,047
Int. Cl. A22c *11/00*
U.S. Cl. 99—108                                 1 Claim

ABSTRACT OF THE DISCLOSURE

The method of providing improved meat particle coherence in sausage and meat loaf products intended for consumption by individuals on a low sodium diet wherein a meat solubilizing agent consisting of potassium chloride and a salt selected from the group consisting of the pyrophosphate and polyphosphate salts of potassium is substituted in place of sodium chloride.

---

The present invention relates to improvements and innovations in sausage and meat loaf products which are suitable for consumption by individuals on a salt free (NaCl) or low sodium diet. More particularly, this invention concerns the use of polyphosphates and pyrophosphates in conjunction with limited amounts of potassium chloride as a substitute for sodium chloride in the manufacture of dietetic sausage and meat loaf products.

It is well known that certain individuals, particularly those with heart disease, vascular diseases of coronary origin and related ailments require a salt free (NaCl) or low sodium diet. This restriction on the diet of these individuals is based on the recognition that sodium increases the tendency of body tissue to accumulate fluids, thereby resulting in an added burden on cardiac muscles.

In the manufacture of sausage products such as weiners for example, and meat loaf products such as luncheon meat, sodium chloride is generally considered to be an essential ingredient. The reason for this is that these products require a meat protein solubilizing agent so that on cooking the ground or comminuted particles have sufficient coherence to provide a product of suitable texture and appearance.

This problem of meat particle coherence has prevented, insofar as applicants are aware, the making of sausage and meat loaf products which are acceptable for individuals with the above-mentioned heart ailments. In this regard, it should be noted that while potassium chloride also functions as a meat protein solubilizing agent and is not harmful to these individuals, it has not provided a satisfactory solution to this problem in that concentrations of potassium chloride which are capable of providing sufficient meat particle coherence impart a bitter and unpalatable taste to these products.

In accordance with the present invention, it has been discovered that polyphosphates and pyrophosphate can be cooperatively combined with low concentrations of potassium chloride to solubilize meat proteins and produce salt free (NaCl) sausage and meat loaf products of satisfactory taste, texture and appearance. In this regard, the potassium salts of the polyphosphates and/or pyrophosphates in conjunction with limited amounts of potassium chloride have been advantageously used in this capacity.

It is therefore an important object of the present invention to provide improved salt free (NaCl) sausage and meat loaf products.

Another object of the present invention is to provide improved sausage and meat loaf products which contain small concentrations of potassium chloride in conjunction with polyphosphate and/or pyrophosphate salts as a substitute for sodium chloride therein.

Another object of the present invention is to provide a method of making improved sausage and meat loaf products suitable for individuals on a salt free or low sodium diet which method involves the use of small concentrations of potassium chloride in conjunction with polyphosphate and/or pyrophosphate salts as a substitute for sodium chloride.

Another object of the present invention is to provide improved sausage and meat loaf products which include limited amounts of potassium chloride in conjunction with potassium polyphosphate and/or pyrophosphate salts as a sodium chloride substitute to solubilize proteins in the meat content of these products and provide the meat particles with sufficient cohesion so that they stick together and form a product of satisfactory texture and appearance.

Another object of the present invention is to provide a method for making improved sausage and meat loaf products which method involves the use of limited amounts of potassium chloride in conjunction with potassium polyphosphate and/or pyrophosphate salts in place of sodium chloride as meat protein solubilizing agents.

Other and further objects of the present invention will be apparent to those skilled in the art from the following detailed description of the invention.

As noted above, the present invention basically involves the discovery that potassium chloride can be cooperatively combined with non-sodium polyphosphate and pyrophosphate salts and used in place of sodium chloride as a meat protein solubilizing agent in the making of sausage and meat loaf products. Texture, taste and appearance characteristics of sausage and meat loaf products prepared in accordance with this invention favorably compare to like products made with sodium chloride. As such, these products are particularly suitable for consumption by individuals suffering from heart disease and similar coronary ailments.

The potassium chloride concentration is, of course, subject to variance depending upon the type and amount of other spices used as well as the desired taste properties of the particular sausage or meat product being made. Generally, it is preferred that the concentration of potassium chloride be kept below 0.5%, however, under certain conditions, concentrations of up to as high as 5.0% can be used without departing from the scope of the present invention.

The amount of polyphosphate and/or pyrophosphate salt used is best expressed in mole fractions rather than on a weight percentage since there is a wide variation in the molecular weights of the various polyphosphate and pyrophosphate salts. As is illustratively set forth in the examples, the present invention encompasses the use of up to 1% by weight of potassium chloride together with up to 1% by weight of a salt selected from the group consisting of the pyrophosphate and polyphosphate salts of potassium in a sausage or lunch meat formulation, which weights are based on the weight of the meat in the formulation.

Examples of potassium polyphosphate and pyrophosphate salts which have been advantageously used in sausage and meat loaf production include potassium polyphosphate, potassium pyrophosphate, tetrapotassium pyrophosphate, potassium hexametaphosphate, potassium tripolyphosphate, tertiary potassium phosphate and monobasic potassium phosphate. It will be understood, however, that other salts exhibiting protein solubilizing characteristics similar to the above mentioned salts can be used either alone or in conjunction therewith. In this regard, it should be noted that while the potassium salts are preferred, other food acceptable anion salts such as, for example, the ammonium and lithium polyphosphate and pyrophosphate salts can also be used.

The following examples serve to illustrate the application of the present invention to the manufacture of both sausage and meat loaf products. Examples 1–6 are particularly concerned with luncheon meat and Example 7 is directed to a weiner type sausage.

In each of Examples 1–6, a standard luncheon meat formulation was used so as to enable a comparison of the various sodium chloride substitutes of the present invention. This formulation consisted of the following basic ingredients:

| | Pounds |
|---|---|
| 80% lean pork shoulder meat | 100 |
| Water | 3 |
| Potassium nitrite | 0.016 |
| Potassium nitrate | 0.032 |
| Ground black pepper | 0.0625 |

In preparing the standard luncheon meat formulation, the pork was chilled to a temperature of 28° F. and ground through a 3/16" plate. The ground emulsion was then vacuum mixed with the potassium nitrite, potassium nitrate, ground black pepper and the particular sodium chloride substitutes given in each of the examples.

Example 1

To the other ingredients in the standard luncheon meat formulation, 0.50 pound of potassium chloride and 0.75 pound of potassium tripolyphosphate were added and mixed for 12 minutes. The formulation was then placed in a cooler at 32° F. for 48 hours and remixed under vacuum for 3 minutes. Some of the thus prepared luncheon meat formulation was packed in 30 ½ ounce cans, sealed under vacuum and processed for 130 minutes at 240° F. The remainder of the formulation was packed in 12 ounce cans, sealed under vacuum and processed for 70 minutes at 225° F.

A cut out average of 97.5% was obtained for the 30 ½ ounce can samples and of 98.4% for the 12 ounce can samples. The cut out referred to above is the quotient obtained by dividing the drained weight of the finished product by the packed product and multiplying by 100. Cut outs in excess of 92% for 12 ounce cans and of 90% for 30 ½ ounce cans are generally considered acceptable as compared to products made with the usual quantities of sodium salt. Informal tasting of the above formulated luncheon meat product indicated that the product was considered acceptable by people familiar with low sodium diets.

Example 2

In this example, 0.75 pound of potassium chloride and 0.50 pound of potassium tripolyphosphate were mixed with the luncheon meat formulation and the same was thereafter processed as was explained above in Example 1. Upon remixing under vacuum conditions, however, the luncheon meat product was packed only into 30 ½ ounce cans, sealed under pressure, and processed for 130 minutes at 240° F. The product exhibited a cut out average of 91.4% and was found acceptable by people familiar with low sodium diets.

Example 3

In this example, 1.00 pound of potassium chloride and 0.50 pound of potassium tripolyphosphate were blended in with the standard meat formulation in the same manner as was described above. After remixing under vacuum conditions for 3 minutes, the product was packed into 30 ½ ounce cans, sealed under pressure, and processed for 130 minutes at 240° F. The thus prepared product showed a cut out average of 95.2% and was found to be acceptable for people familiar with low sodium diets.

Example 4

In this example, 1.00 pound of potassium chloride and 1.00 pound of potassium pyrophosphate were blended into the standard meat formulation as a sodium chloride substitute in the same manner as was described above. Upon remixing under vacuum conditions, the thus prepared product was then packed into 12 ½ ounce cans, sealed under vacuum conditions and processed for 70 minutes at 225° F. The product had a cut out average of 98.3% and was found to be acceptable to people familiar with the low sodium diet.

Example 5

In this example, 1.00 pound of potassium chloride, 0.50 pound of tertiary potassium phosphate and 0.50 pound of monobasic potassium phosphate were blended in as a sodium chloride substitute in the standard meat formulation. The formulation was then processed exactly as was described in Example 1. Upon remixing under vacuum, the product was placed in 12 ½ ounce cans, sealed under pressure and processed for 70 minutes at 225° F. This product had a cut out average of 93.5% and as was true of the other products, was found to have an acceptable taste to people familiar with a low sodium diet.

The above results clearly show the advantages of the present invention with regard to its applicability in luncheon meat products. In particular, the results show that the potassium chloride concentration of around 1.00% when combined with the given amounts of various potassium polyphosphate and pyrophosphate salts are completely suitable as a sodium chloride substitute.

Example 6

The following example illustrates the applicability of the present invention to weiner type sausages. The following ingredients were reduced to a uniform size by passing them through a standard meat grinder:

| | |
|---|---|
| 50% lean pork | 54.80 |
| 88% lean beef | 16.80 |
| 80% lean pork | 15.00 |
| Skinned pork jowls | 10.00 |
| Veal trimmings | 3.40 |
| Water | 18.82 |
| Spice, dextrose, corn syrup solids | 2.00 |
| Potassium tripolyphosphate | 1.00 |
| Potassium chloride | 0.50 |
| Ascorbic acid | 0.05 |
| Potassium nitrate | 0.032 |
| Potassium nitrite | 0.016 |

All of these ingredients were added to a standard meat chopper and chopped until a temperature of 68° F. was reached. The chopped batter was then mixed for ½ minute under maximum vacuum. The thus prepared batter was then stuffed into cellulose weiner casings and subjected to the usual processing conditions in a continuous weiner making operation.

During the chopping operation, it was observed that the meat product acted quite comparable to similar meat products with sodium salts. Thus the emulsion was extremely tacky and well knit together. The finished product showed no fat or water separation between the casing and the meat and the cellulose casing was easily stripped off. The finished weiners were of excellent texture and appearance, being quite firm on eating. The flavor thereof was judged to be acceptable by people familiar with a low sodium diet.

As mentioned above, the present invention is directed to the manufacture of dietetic sausage and meat products. As such, it is of course subject to numerous variations and modifications, all of which will be obvious to those skilled in this art. Having fully disclosed this invention setting forth examples teaching and illustrating the presently preferred embodiments thereof, what is claimed as new is:

1. The method of providing improved meat particle coherence in sausage and meat loaf products intended for consumption by individuals on a low sodium diet, said method comprising the step of adding to the meat particles a meat protein solubilizing agent consisting of potassium chloride and a salt selected from the group consisting of the pyrophosphate and polyphosphate salts of potassium said solubilizing agent being added to said meat particles in an amount which will provide said meat particles with a potassium chloride concentration of up to approximately 1% by weight and a concentration of said salt selected from the group consisting of the pyrophosphate and polyphosphate salts of potassium of up to approximately 1% by weight, said weights being based on the weight of the meat in said product.

References Cited

UNITED STATES PATENTS

| | | |
|---|---|---|
| 2,601,112 | 6/1952 | Freedman. |
| 2,888,351 | 5/1959 | Olson et al. |
| 3,076,713 | 2/1963 | Maas _____ 99—159 X |
| 3,154,421 | 10/1964 | Voegeli et al. _____ 99—159 |

HYMAN LORD, *Primary Examiner.*

U.S. Cl. X.R.

99—109